United States Patent [19]

Schmidt et al.

[11] 3,915,991

[45] Oct. 28, 1975

[54] 1-ARYL CYCLIC SULFONIUM COMPOUNDS

[75] Inventors: Donald L. Schmidt; Hugh B. Smith, both of Midland, Mich.; Melvin J. Hatch, Socorro, N. Mex.; William E. Broxterman, Midland, Mich.

[73] Assignee: The Dow Chemical Company, Midland, Mich.

[22] Filed: July 26, 1973

[21] Appl. No.: 382,977

[52] U.S. Cl.... 260/329 S; 260/327 TH; 260/329 R; 260/332.2 R; 260/332.3 R; 260/332.5; 260/874; 260/901
[51] Int. Cl.²............... C07D 333/02; C07D 335/02
[58] Field of Search... 260/327 TH, 329 R, 332.2 R, 260/332.3 R, 332.5, 329 S

[56] References Cited
OTHER PUBLICATIONS

Nambara, et al., Yakugaku, Zasshi, 83:642–647 (1963).

*Primary Examiner*—Norma S. Milestone
*Assistant Examiner*—C. M. S. Jaisle
*Attorney, Agent, or Firm*—Chessie E. Rehberg

[57] ABSTRACT

New compounds of the formula

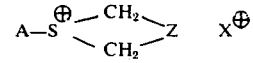

wherein A is phenyl or naphthyl and may bear substituents such as Cl, alkyl or alkoxy; Z is $-CH_2CH_2-$ or $-CH_2CH_2CH_2-$ and may bear substituents such as alkyl, alkoxy or OH; and $X^\ominus$ is an anion are made by cyclizing the corresponding aryl thioether A—S—CH$_2$ZCH$_2$OH by treatment with chlorosulfonic acid or tosyl chloride. They are useful for modifying carboxyl-containing polymers. The carboxyl group opens the heterocyclic ring and forms the corresponding arylmercapto aliphatic ester. This, especially when A bears an alkyl group of four or more carbon atoms, improves the water resistance of the polymer.

11 Claims, No Drawings

1-ARYL CYCLIC SULFONIUM COMPOUNDS

BACKGROUND OF THE INVENTION

Somewhat related compounds wherein the aromatic nucleus, A in the above formula, bears a phenolic hydroxyl group are shown in U.S. Pat. Nos. 3,660,431 and 3,636,052. They form internal salts and are polymerizable. While they react with carboxyl-containing polymers, the products thus obtained have poor resistance to deterioration by UV radiation. Other sulfonium compounds are shown in U.S. Pat. No. 3,544,499.

T. Nambura and N. Matsuhisa, Yakugaky Zasshi, 83,642 (1963), have reported the synthesis of the toluenesulfonate salts of tetrahydro-1-phenylthiophene

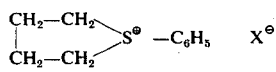

and the 4-methylphenyl homolog. Their interest was to study the chemotherapeutic properties of the compounds.

SUMMARY OF THE INVENTION

The present invention comprises new 1-aryl cyclic sulfonium compounds and methods for their preparation. The compounds have the formula I:

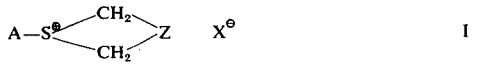

wherein A is a phenyl or naphthyl group having 1–3 substituents thereon selected from the group consisting of alkyl, alkoxy and Cl, provided that when only one such substituent is present and it is alkyl it has at least 4 carbon atoms; Z is $-CH_2OH-CH_2OH-$, or $(CHR)_n$; R is H or lower alkyl, $n$ is 2 or 3 and $X^\ominus$ is an anion.

The above compounds are preferably made by the reaction of chlorosulfonic acid or tosyl chloride on the corresponding aryl thioether:

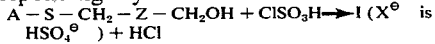

The products are readily soluble or dispersible in water and are particularly useful for increasing the water resistance of coatings made from carboxyl-containing polymers, such as copolymers of maleic anhydride or acrylic or methacrylic acid with styrene, alkyl acrylate or vinyl acetate.

DETAILED DESCRIPTION OF THE INVENTION

The compounds of Formula I are typically crystalline, water-soluble salts, which fact facilitates their use in polymer latices and in aqueous solutions of water-soluble polymers. The salts formed weakly nucleophylic acids, such as the chloride, bisulfate or bicarbonate, are more stable than the free bases ($X^\ominus$ is $OH^\ominus$) or the salts of strong nucleophiles, such as bromide, acetate, etc., though the latter type can be made and used if stored for only short times and/or at low temperatures.

The compounds of the invention may be regarded as derived from a thiophenol moiety (A–S in Formula I) and a 1,4- or 1,5-alkylene moiety ($-CH_2-Z-CH_2-$ in Formula I). Their synthesis comprises joining these two moieties. In general, this involves condensing a thiophenol with a 1,4- or 1,5-alkylene compound having reactive end groups, such as Cl, Br, I, $OSO_3H$ or the like.

Suitable thiophenols include not only thiophenol itself but the thionaphthols and the substituted thiophenols and thionaphthols wherein there are one or more innocuous substituents, such as Cl, alkyl, alkoxy, phenyl, phenoxy and the like. As examples of such thiophenols may be mentioned 2,4-dichloro-, 3,5-dimethyl-, 4-tert.-amyl-, 2-chloro-4-methyl-, 4-dodecyl-3-methyl-4-butoxy-, 4-phenyl-, 4-phenoxy-, 2-methyl-4-octyl- and 2,4,6-trimethylthiophenol and the similarly substituted thionaphthols. Preferred are the alkylthiophenols having at least 4 carbon atoms in the alkyl moiety, because the sulfonium product made therefrom is especially effective in increasing the water resistance of carboxyl-containing polymers treated therewith. Especially preferred are the compounds derived from tert.-alkylthiophenols, because coatings containing them have improved resistance to degradation by UV light.

The reactant that is condensed with the thiophenol to produce the sulfonium products is characterized by having reactive end groups separated by 4 or 5 carbon atoms. These intervening carbon atoms may bear one or more substituents, such as lower alkyl (i.e., alkyl of 1–4 carbon atoms), lower alkoxy, hydroxy, and the like. Suitable such reactants include 1,4-dibromobutane, 1,5-dibromopentane, 4-bromobutanol, 5-chloropentanol, 1,2,3-trihydroxy-4-bromobutane, 2,3-dimethyl-1,4-dibromopentane, 1,4-dibromo-2-chlorobutane, and the like.

A wide variety of the above reactants are commercially available or can readily be made by known methods.

The above reactants can be condensed to produce the compounds of the invention by several methods:

a. the thiophenol or its alkali metal salt is reacted with a 1,4- or 1,5-dibromoalkane or alkene in the presence of excess alkali;

b. the thiophenol alkali metal salt is reacted with a 4- or 5-haloalcohol to produce the 4- or 5-hydroxyalkyl or aryl sulfide and the latter is then cyclized by treatment with tosyl chloride;

c. the preferred method replaces the tosyl chloride of (b) with chlorosulfonic acid. This produces directly the bisulfate salt of the sulfonium product.

In the preferred process, the 4- or 5-hydroxyalkyl or -alkenyl aryl sulfide is reacted with an equivalent amount of chlorosulfonic acid in an inert solvent, such as methylene chloride, perchloroethylene, carbon tetrachloride or benzene, at a temperature of about −10°C. or lower, thus to form the bisulfate ester. Vacuum distillation of the solvent together with gradual warming of the residue to about 70°C. causes ring closure, thus forming the bisulfate salt of the cyclic sulfonium compound. The mixing of the reactants is conducted at low temperature to avoid danger of sulfonating the aromatic nucleus. Its ease of sulfonation varies according to the substituents thereon, so that as a general rule it is preferred to operate at −30°C. or lower to avoid the possibility of sulfonation.

The anionic moieties of the cyclic sulfonium salts are easily interchanged to form other salts or the free bases by known methods; for example, by anion exchange with another salt or, preferably, by use of an anion exchange resin.

SPECIFIC EMBODIMENTS OF THE INVENTION

The following examples illustrate the practice of the invention.

EXAMPLE 1

Preparation of 1-(4-tert.-butylphenyl)-tetrahydrothiophenium Bisulfate

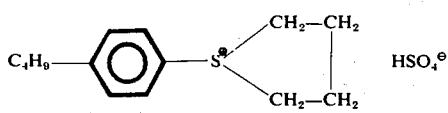

A. Preparation of 4-Tert.-Butylphenyl 4-Hydroxybutyl Sulfide

A solution of 150 g. (1.245 m.) of 4-chlorobutanol (prepared by the reaction of conc. HCl on tetrahydrofuran) in 375 ml. of acetone was prepared. To it was added a solution of 207 g. (1.245 m.) of 4-tert.-butylthiophenol and 105 g. (1.311 m.) of 50% aqueous NaOH in 300 ml. of methanol while maintaining the mixture at reflux temperature. After an additional 2 hours of reflux, the solvents were distilled under vacuum to give an 85% yield of the desired sulfide.

B. Conversion of the Sulfide to Cyclic Sulfonium Salt

A solution of 24.5 g. (0.21 m.) of chlorosulfonic acid in 200 ml. of methylene chloride was cooled to −65°C. Then 50 g. (0.21 m.) of the sulfide prepared as described above was added slowly with stirring. The temperature of the mixture was allowed to rise to 15°C. over a period of 1.5 hours. The solvent was then distilled under vacuum at 15°, leaving a clear, sirupy liquid. When further warmed to 70°C. under vacuum ring closure occurred, giving an 80% yield of the cyclic sulfonium bisulfate.

C. Conversion of the Bisulfate to the Bicarbonate

An aqueous solution of the bisulfate was converted to the bicarbonate by passing it through an anion exchange resin (Dowex 1X8, 20–50 mesh) in the bicarbonate form.

D. Use of the Sulfonium Salt to Modify a Carboxyl-Containing Polymer

A 20% by weight aqueous solution of the sulfonium bicarbonate prepared as described above was added to a 15% by weight solution of the ammonium salt of a copolymer of 12% (by weight) acrylic acid, 10% butyl acrylate and 78% methyl methacrylate, the amount added being sufficient to supply 0.9 equivalent of sulfonium salt per equivalent of acrylic acid (salt) in the copolymer. The resultant solution was applied as a coating on a solid substrate and cured by heating at 80°C. for 10 minutes. The cured film showed no visible effect from 24 hour immersion in water whereas a similar coating made from the copolymer solution but without addition of the sulfonium salt water-soluble and dissolved within a few minutes.

EXAMPLES 2–6

By use of the general procedure of Example 1 with appropriate substitution of reactants, other cyclic sulfonium salts were prepared and used with similar results.

Table I shows the compounds by formula (omitting the neutralizing anion since they are interchangeable) and identifies the reactants from which they were prepared.

TABLE I

| Example | Compound | Reactants Thiophenol | Other |
|---|---|---|---|
| 2 | (CH₃)₃C—⌬—S⁺(CH₂—CHCH₃)(CH₂—CH₂) | 4-tert.-butyl- | 2-methyl-4-chlorobutanol |
| 3 | (CH₃)₃C—⌬—S⁺(CH₂—CHOH)(CH₂—CHOH) | " | 1-bromo-2,3,4-trihydroxybutane |
| 4 | CH₃O—⌬(CH₃)—S⁺(CH₂—CH₂)(CH₂—CH₂) | 3-methyl-4-methoxy- | 4-chlorobutanol |
| 5 | naphthyl—S⁺(CH₂—CH₂)(CH₂—CH₂) | 2-naphthalenethiol | " |
| 6 | (CH₃)₃C—⌬—S⁺(CH₂—CH₂)(CH₂)(CH₂—CH₂) | 4-tert.-butyl- | 5-chloropentanol |

In a similar manner, other compounds of the invention are prepared by substitution of the appropriate reactants and are useful for the same purposes. Illustrative examples are shown in Table II.

TABLE II

| Example | Compound | Reactants Thiophenol | Other |
|---|---|---|---|
| 8 | 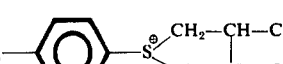 | 4-phenyl- | 1,4-dibromo-2,3- |
| 10 |  | 4-dodecyl- | 2-(2-chloroethyl)-hexanol |
| 11 |  | 2-methyl-4-hexyl- | 2-butoxy-4-chlorobutanol |
| 12 | 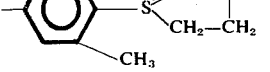 | 2,6-dimethyl- | 3-methyl-4-bromo-1,2-propylene glycol |

We claim:

1. A compound of the formula

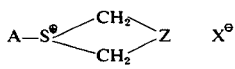

wherein A is a phenyl group having 1–3 substituents therein selected from the group consisting of alkyl of 4 to 12 carbon atoms, alkoxy of 1 to 4 carbon atoms and a naphthyl group; Z is —CHOH—CHOH—or —(CHR-)$_n$—; R is H or lower alkyl, $n$ is an integer 2–3 and $X^\ominus$ is one equivalent of an anion.

2. The compound of claim 1 wherein A is a phenyl group.

3. The compound of claim 2 wherein A is tert.-butyl-phenyl.

4. The compound of claim 3 wherein Z is —(CH$_2$-)$_2$—.

5. The compound of claim 1 wherein Z is —CHR—CH$_2$—.

6. The compound of claim 5 wherein R is H.

7. The compound of claim 1 wherein Z is —CHOH-CHOH—.

8. The compound of claim 1 wherein $X^\ominus$ is $Cl^\ominus$, $Br^\ominus$, $HSO_4^\ominus$ or $HCO_3^\ominus$.

9. The compound of claim 1 wherein A is an alkylphenyl group the alkyl moiety of which has 4 to 12 carbon atoms.

10. The compound of claim 9 wherein R is H and $n$ is 2.

11. The compound of claim 8 wherein A is an alkylphenyl group the alkyl moiety of which has 4 to 12 carbon atoms.

* * * * *